United States Patent
Mizuno

(10) Patent No.: US 10,137,699 B2
(45) Date of Patent: Nov. 27, 2018

(54) IMAGE FORMING METHOD

(71) Applicant: FUJIFILM Corporation, Tokyo (JP)

(72) Inventor: Tomohiro Mizuno, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/793,625

(22) Filed: Oct. 25, 2017

(65) Prior Publication Data

US 2018/0056666 A1 Mar. 1, 2018

Related U.S. Application Data

(63) Continuation of application No. PCT/JP2016/061550, filed on Apr. 8, 2016.

(30) Foreign Application Priority Data

May 15, 2015 (JP) ................................ 2015-099794

(51) Int. Cl.
*B41J 2/21* (2006.01)
*B41J 2/205* (2006.01)
(Continued)

(52) U.S. Cl.
CPC ............. *B41J 2/205* (2013.01); *B41J 2/01* (2013.01); *B41J 2/21* (2013.01); *B41J 2/525* (2013.01);
(Continued)

(58) Field of Classification Search
CPC ..... B41J 2/205; B41J 2/21; B41J 2/525; B41J 2/01; B41M 5/0023; B41M 5/00; G06K 15/1844; G06K 15/107; G06K 15/1876; H04N 1/52
See application file for complete search history.

(56) References Cited

U.S. PATENT DOCUMENTS

2007/0109604 A1 5/2007 Marumoto
2010/0045723 A1 2/2010 Kato et al.
2010/0285281 A1* 11/2010 Mashtare .................. B41J 3/38
428/195.1

FOREIGN PATENT DOCUMENTS

CN 1693085 A 11/2005
CN 1872555 A 12/2006
(Continued)

OTHER PUBLICATIONS

International Search Report issued in PCT/JP2016/061550; dated Jun. 28, 2016.
(Continued)

*Primary Examiner* — Yaovi M Ameh
(74) *Attorney, Agent, or Firm* — Studebaker & Brackett PC

(57) ABSTRACT

An image forming method of the present invention is an image forming method of forming a halftone image on a corrugated fiberboard recording medium using an inkjet recording device that uses magenta ink and other inks with two or more colors other than the magenta ink, and is an efficient method that does not generate a mottle in an image printed in multicolor on a corrugated fiberboard recording medium using an inkjet recording device by determining a droplet ejection position of the magenta ink and then determining droplet ejection positions of the other inks with two or more colors to be positions different from the droplet ejection position of the magenta ink.

11 Claims, 18 Drawing Sheets

(51) Int. Cl.
*B41J 2/01* (2006.01)
*B41M 5/00* (2006.01)
*B41J 2/525* (2006.01)
*G06K 15/02* (2006.01)
*G06K 15/10* (2006.01)
*H04N 1/52* (2006.01)

(52) U.S. Cl.
CPC ............ *B41M 5/00* (2013.01); *B41M 5/0023* (2013.01); *G06K 15/107* (2013.01); *G06K 15/1844* (2013.01); *G06K 15/1876* (2013.01); *H04N 1/52* (2013.01)

(56) References Cited

FOREIGN PATENT DOCUMENTS

| CN | 101108562 A | 1/2008 | | |
| EP | 1263209 A2 | 12/2002 | | |
| JP | 2003-118150 | * | 4/2003 | ............... B41J 2/21 |
| JP | 2003-118150 A | | 4/2003 | |
| JP | 2007-136735 A | | 6/2007 | |
| JP | 2007-253602 A | | 10/2007 | |
| JP | 2012-061781 A | | 3/2012 | |
| JP | 2013-066082 A | | 4/2013 | |

OTHER PUBLICATIONS

Written Opinion issued in PCT/JP2016/061550; dated Jun. 28, 2016.

An Office Action mailed by the State Intellectual Property Office of the People's Republic of China dated Apr. 4, 2018, which corresponds to Chinese Patent Application No. 201680027875.8 and is related to U.S. Appl. No. 15/793,625.

Extended European Search Report issued by the European Patent Office dated Jul. 13, 2018, which corresponds to EP16796222.4-1019 and is related to U.S. Appl. No. 15/793,625.

* cited by examiner

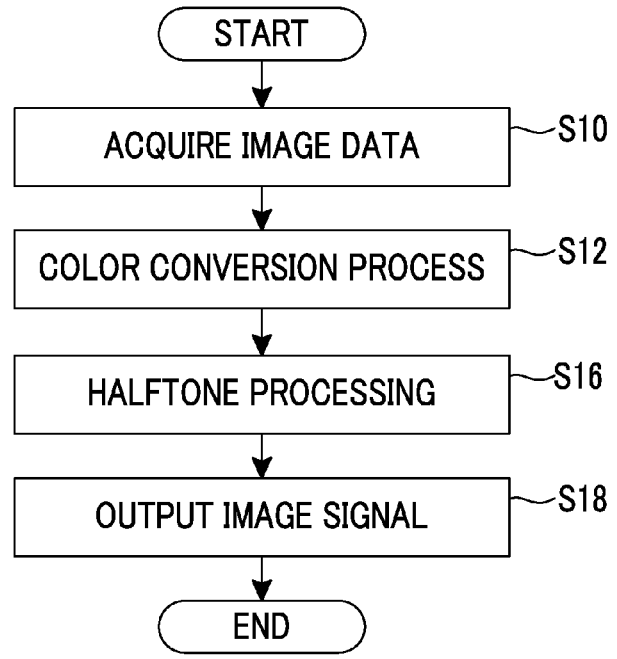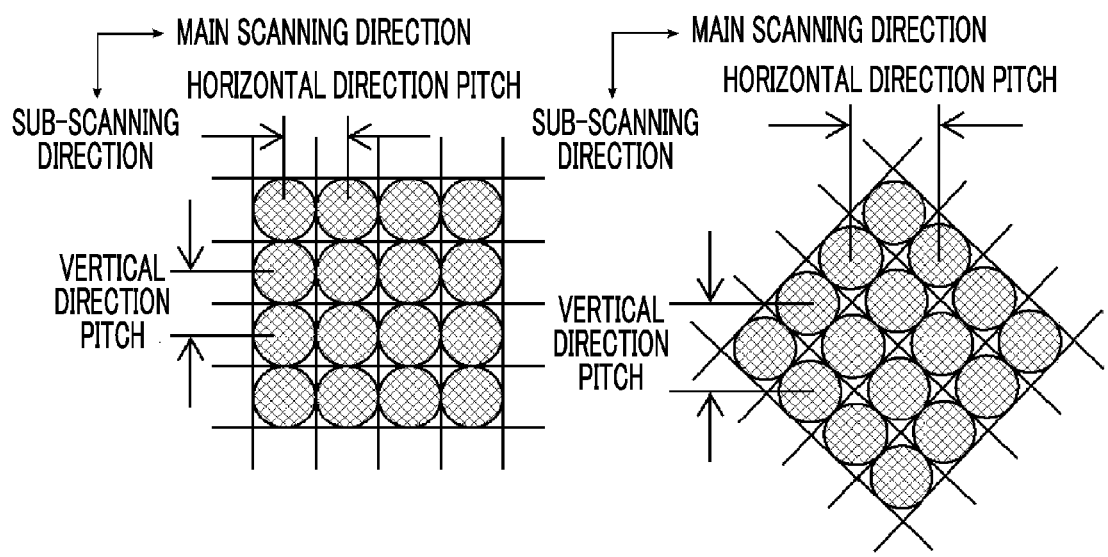

SIGNAL VALUE OF Y    SIGNAL VALUE OF M    SIGNAL VALUE OF X(M+Y)

S    SIGNAL VALUE OF X    HT PATTERN OF X

HT PATTERN OF X    HT PATTERN OF M    HT PATTERN OF Y

IMAGE FORMING METHOD

CROSS REFERENCE TO RELATED APPLICATIONS

This application is a continuation application of International Application No. PCT/JP2016/061550 filed on Apr. 8, 2016, which claims priority under 35 U.S.C. 119(a) to Japanese Patent Application No. 2015-099794 filed on May 15, 2015, all of which are hereby expressly incorporated by reference into the present application.

BACKGROUND OF THE INVENTION

1. Field of the Invention

The present invention relates to an image forming method, and particularly, to an mage forming method of forming a halftone image on a corrugated fibreboard recording medium using an inkjet recording device.

2. Description of the Related Art

It is known that deterioration of an image called a mottle occurs in a case where multicolor printing is performed on a recording medium using an inkjet recording scheme. This phenomenon is due to the fact that since moisture exceeding the amount of moisture that can be absorbed into the recording medium is contained in an ink that is used in an inkjet recording device, an ink that cannot penetrate the recording medium overflows on a surface of the recording medium at the time of printing using the inkjet recording scheme and, as a result, movement of the ink occurs on the recording medium, resulting in light and shade of a pigment.

In order to suppress such a mottle, a technology of providing a time difference in a case where each ink is ejected (JP2012-61781A) and a technology of changing an ink ejection position for each color (JP2013-66082A) have been proposed.

JP2012-61781A discloses changing a timing at which each ink is ejected to suppress blurring and color mixing in an image in a case where different ink dots are formed to overlap on a medium using an inkjet recording device including an ink nozzle array of each ink that ejects the ink to form ink dots on the medium and a control unit that controls an ink ejection operation.

JP2013-66082A discloses performing halftone processing using a dither method on each piece of color plate data obtained by converting each piece of color plate data of CMYK to have 1/n (n is an integer equal to or greater than 2) of output resolution, replacing a dot pattern of each piece of color plate data with a dot pattern corresponding to a coloring material usage reduction rate, making the replaced dot patterns different between the color plates, and performing changing so that dots of the respective colors do not overlap to suppress blurring.

SUMMARY OF THE INVENTION

In recent years, for multicolor printing on a corrugated fibreboard recording medium, introduction of digital printing using an inkjet recording scheme has been attempted with the advancement of an inkjet printing technology instead of so-called analog printing using a flexographic plate of the related art.

Generation of the mottle as described above even in a case where printing using an inkjet recording scheme is performed on a corrugated fibreboard recording medium is known, but in the technologies disclosed in JP2012-61781A and JP2013-66082A, there is a problem in that the mottle of the image formed on the corrugated fibreboard recording medium cannot be sufficiently solved and it takes time to output the image.

An object of the present invention is to solve the above problems of the related art and provide an efficient image forming method that does not generate a mottle in an image printed in multicolor on a corrugated fibreboard recording medium using an inkjet recording device.

In order to achieve the above object, an image forming method of the present invention is an image forming method of forming a halftone image on a corrugated fibreboard recording medium using an inkjet recording device that uses magenta ink and other inks with two or more colors other than the magenta ink, the image forming method comprising: determining a droplet ejection position of the magenta ink and then determining droplet ejection positions of the other inks with two or more colors to be positions different from the droplet ejection position of the magenta ink.

Here, it is preferable that the droplet ejection positions of the other inks with two or more colors are determined so that print positions of a liquid droplet of the magenta ink and liquid droplets of the other inks with two or more colors that are ejected at a predetermined pitch onto the corrugated fibreboard recording medium are different.

Further, the droplet ejection positions of the other inks with two or more colors can also be determined so that droplet ejection positions of the inks having different coloring materials are different positions.

Here, it is preferable that the droplet ejection positions of the other inks with two or more colors are determined so that print positions of the liquid droplets of inks having different coloring materials to be ejected at a predetermined pitch on the corrugated fibreboard recording medium are different.

Further, the droplet ejection positions of the other inks with two or more colors can also be determined so that droplet ejection positions of the inks with different coloring materials are the same positions.

Here, it is preferable to determine a halftone pattern of the magenta ink having the predetermined pitch using a dither matrix, and then, determine halftone patterns of other inks with the two or more colors having the predetermined pitch to fill a predetermined area of the dither matrix to which the halftone pattern of the magenta ink is not assigned in order to determine the droplet ejection position of the magenta ink and the droplet ejection positions of the other inks with two or more colors.

The predetermined area of the dither matrix to which the halftone pattern of the magenta ink is not assigned is an area included in an area in which the halftone pattern of the magenta ink and the halftone pattern of other inks with two or more colors overlap, and is an area at a position on the dither matrix in a case where the droplet ejection position at which the dot of magenta ink is not printed on the halftone pattern of the magenta ink is projected onto the dither matrix of other inks with two or more colors.

It is preferable to determine halftone patterns of the other inks with two or more colors using the dither matrix so that liquid droplets of inks having different coloring materials of the other inks with two or more colors that are ejected onto the corrugated fibreboard recording medium overlap in order to determine the droplet ejection positions of the other inks with two or more colors.

It is preferable to determine halftone patterns of the other inks with two or more colors using the dither matrix so that print positions of inks having different coloring materials of the other inks with two or more colors that are ejected onto the corrugated fibreboard recording medium are different in order to determine the droplet ejection positions of the other inks with two or more colors.

It is preferable to determine halftone patterns of other inks with two or more colors preferentially from an ink having the highest visual density using the dither matrix in order to determine the droplet ejection positions of the other inks with two or more colors.

It is preferable to determine halftone patterns of the magenta ink and the other inks with two or more colors so that the halftone pattern of the magenta ink and the halftone patterns of the inks with two or more colors are shifted by a half pitch using the dither matrix in order to determine the droplet ejection position of the magenta ink and the droplet ejection positions of the other inks with two or more colors.

The inkjet recording device includes a recording head including a magenta nozzle array in which a plurality of nozzles that jets a magenta ink are arranged at a predetermined pitch in a main scanning direction and at equal intervals, and two or more other ink nozzle arrays in which a plurality of nozzles that jet other inks with two or more colors are arranged at a predetermined pitch in the main scanning direction and at equal intervals for each coloring material, and the two or more other ink nozzle arrays are arranged to be shifted by the half pitch in the main scanning direction or a sub-scanning direction with respect to the magenta nozzle array.

According to the present invention, in a case where multicolor printing is performed on a corrugated fibreboard recording medium using an inkjet recording scheme, it is possible to easily form an image in which a mottle is not generated.

Further, according to the present invention, it is possible to easily and efficiently generate the image pattern of each color that is printed in multicolor on the corrugated fibreboard recording medium.

BRIEF DESCRIPTION OF THE DRAWINGS

FIG. 1 is a block diagram illustrating an example of an image forming method according to a first embodiment.

FIGS. 2A and 2B are diagrams illustrating a term "predetermined pitch".

DESCRIPTION OF THE PREFERRED EMBODIMENTS

Hereinafter, an image forming method according to the present invention will be described in detail with reference to preferred embodiments illustrated in the accompanying drawings.

First Embodiment

FIG. 1 is a diagram illustrating an example of an image forming method according to a first embodiment of the present invention.

In the image forming method of the present invention, a color image is acquired as RGB data, and a halftone image is recorded on a corrugated fibreboard recording medium using a printing device (inkjet recording device) according to an inkjet recording scheme of ejecting coloring materials (ink) of M (magenta), C (cyan), Y (yellow) and K (black) at a predetermined pitch.

First, in step S10, image data (RGB data) to be output by the inkjet recording device is acquired.

Then, in step S12, the acquired RGB data is converted into image data of each of three colors in MCYK, such as MCY, MCK, or MYK, or four colors of MCYK.

Then, in step S16, halftone processing is performed on the image data after a color conversion process to determine a halftone pattern (mask pattern) of each color.

Here, the halftone pattern to be determined of each color is determined so that a droplet ejection position of M ink and droplet ejection positions of inks excluding the M ink, that is, K ink, Y ink, and C ink are different from each other in a halftone image formed by overlap, that is, the image subjected to the halftone process.

Here, the term "predetermined pitch" used in this embodiment will be described with reference to FIGS. 2A and 2B. FIGS. 2A and 2B illustrate liquid droplets (dots) in a case where predetermined ink is ejected while moving the recording medium in a sub-scanning direction, and a square grid (4×4) in FIGS. 2A and 2B indicates a pixel.

In a case where dots are formed as illustrated in FIG. 2A, the "predetermined pitch" refers to a distance between centers of adjacent liquid droplets. A pitch in a sub-scanning direction is referred to as a "vertical direction pitch", and a pitch in a main scanning direction is referred to as a "horizontal direction pitch".

As illustrated in FIG. 2B, in a case where liquid droplets are formed on the square grid of FIG. 2A rotated by 45°, the "predetermined pitch" refers to a distance between adjacent liquid droplets in the main scanning direction or the sub scanning direction. The distance between adjacent liquid droplets in the sub scanning direction is referred to as a "vertical direction pitch", and the distance between adjacent dots in the main scanning direction is referred to as a "horizontal direction pitch".

Figure 3:
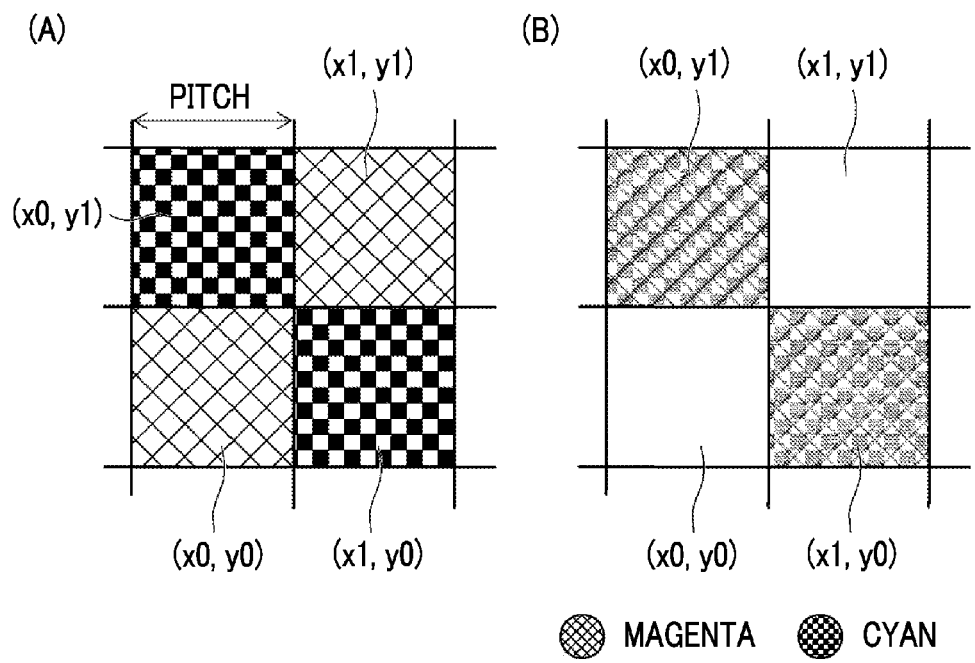
FIG. 3 is a diagram illustrating a state in which "the droplet ejection position is different" and a state in which "the droplet ejection position is the same".

Further, an expression "the droplet ejection positions are different/the same" used in this embodiment will be described with reference to FIGS. 3(A) and 3(B). FIG. 3(A) illustrates a state in which the droplet ejection positions are different, and FIG. 3(B) illustrates a state in which the droplet ejection positions are the same.

First, as a premise, the "droplet ejection position" refers to a position designated so that an ink droplet is printed at the position on an image subjected to halftone processing (halftone dot processing), that is, on binarized (or ternarized or quaternarized) image data. FIGS. 3(A) and 3(B) illustrate a state in which cyan and magenta have been ejected at any one of pixels (x0, y1), (x1, y1), (X0, y0), and (x1, y0) that are determined at a predetermined pixel (a "pitch" in FIGS. 3(A) and 3(B)) on the image subjected to the halftone processing.

The state in which "droplet ejection positions are different" refers to a state in which the droplet ejection positions of ink are formed at different pixel positions on the image subjected to the halftone process, that is, a state in which cyan is ejected onto (x0, y1) and (x1, y0) and the magenta is ejected onto (X0, y0) and (x1, y1), as illustrated in FIG. 3(B).

On the other hand, the state "droplet ejection positions are the same" refers to a state in which the ink droplet ejection positions are formed at the same pixel positions on the image subjected to the halftone processing, that is, a state, droplets of cyan and magenta are not ejected onto (x0, y0) and (x1, y1), droplets of the cyan and the magenta are ejected onto (x0, y1) and (x1, y0), the colors are mixed, and blue is generated, as illustrated in FIG. 3(B).

In FIG. 3(A) and FIG. 3(B), cyan and magenta are used as the ink droplets, but the ink droplets are not limited to these inks as long as the inks are different coloring materials.

Figure 4:
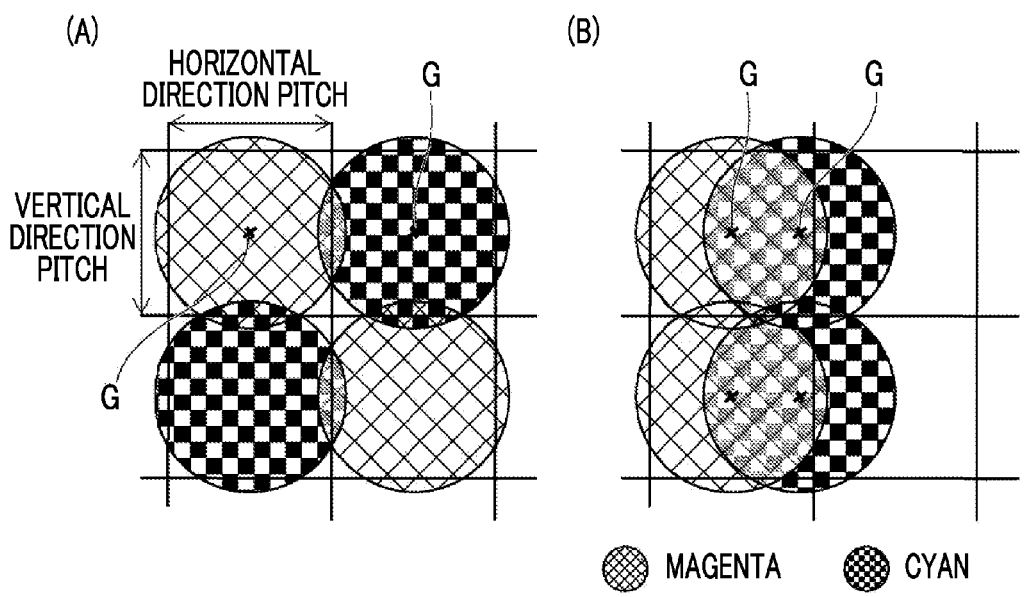
FIG. 4 is a diagram illustrating a state in which "print positions are different" and a state in which "print positions are the same".

Further, an expression "print positions are different/the same" used in this embodiment will be described with reference to FIG. 4(A) and FIG. 4(B). FIG. 4(A) illustrates a state in which the print positions are different, and FIG. 4(B) illustrates a state in which the print positions are the same.

First, as a premise, the "print position" refers to a position at which there is an ink liquid droplet on the recording medium.

The expression "print positions are different" refers to a state in which a centroid of each liquid droplet formed on the recording medium is present in a different pixel area that is determined by a predetermined pixel pitch and refers to a state in which centroids G of the cyan liquid droplet and the magenta liquid droplet are present in different pixel areas (pixel areas determined by the pitch in the vertical direction and the pitch in the horizontal direction in FIG. 4(A)) as illustrated in FIG. 4(A).

On the other hand, the expression "print positions are the same" refers to a state in which a centroid of each liquid droplet formed on the recording medium is present in the same pixel area that is determined by a predetermined pixel pitch and refers to a state in which centroids G of the cyan liquid droplet and the magenta liquid droplet are present in the same pixel areas (pixel areas determined by the pitch in the vertical direction and the pitch in the horizontal direction in FIG. 4(B)) as illustrated in FIG. 4(B).

In FIGS. 4(A) and 4(B), cyan and magenta are used as the ink droplets, but the ink droplets are not limited to such inks as long as ink droplets are different coloring materials.

Such image forming conditions have been found by the present inventors conducting intensive research on image formation on a corrugated fibreboard recording medium using an inkjet recording scheme and finding out the following content.

Figure 5:
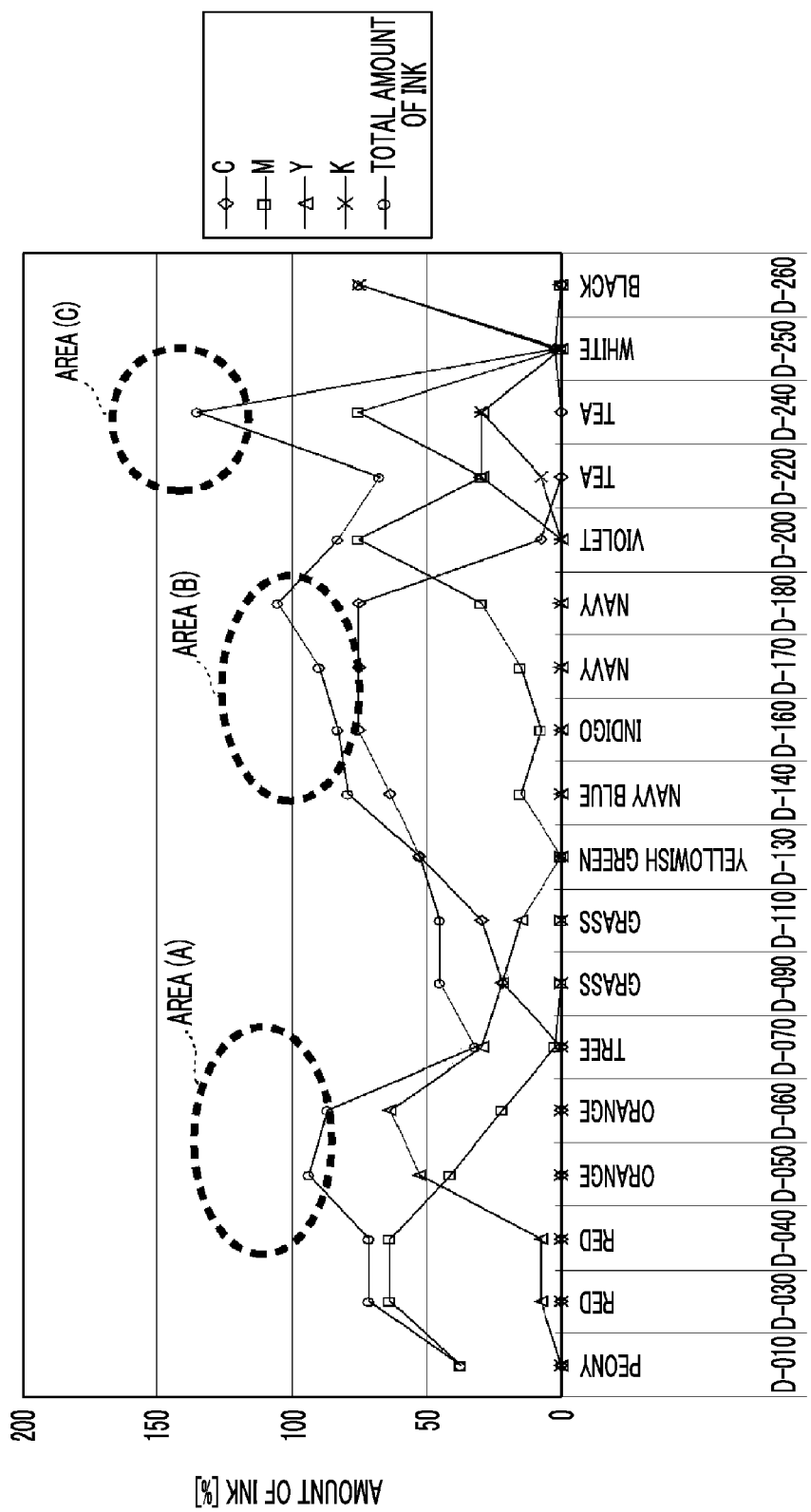
FIG. 5 is a graph illustrating each usage amount and a total ink amount of CMYK inks that are used in a case where 18 colors defined by JCS (corrugated fibreboard industry standard) are reproduced by inkjet printing.

As described above, in a case where multicolor printing is performed on a corrugated fibreboard recording medium using an inkjet recording device, an image in which a mottle is generated is generated. Generally, however, in the corrugated printing, printing for reproducing a color selected from among 18 kinds of colors defined in a color standard (JCSM 0001: 2000) printed on a corrugated fibreboard prescribed as the Japan Corrugated Industry Association industry standard (JCS) is actually performed. Therefore, the present inventors investigated a usage amount and a total ink amount of the C ink, the M ink, the Y ink, and the K ink that are used to reproduce 18 kinds of colors in inkjet printing onto a corrugated fibreboard recording medium, and a result as illustrated in FIG. 5 was obtained. A vertical axis in FIG. 5 indicates each ink usage amount and a total ink amount, and a horizontal axis indicates 18 kinds of color names and code numbers thereof defined by JCS.

From the result illustrated in FIG. 5, the inventors of the present invention have found that a mottle is bad in a case where colors regarding areas illustrated in (A) to (C) in FIG. 5, that is, areas with a large total ink amount are reproduced, and a deviation is generated in the usage amount of CMYK ink as illustrated in (1) to (4) below.

That is, the inventors of the present invention have found that (1) a total ink amount may be small in a case where C ink and the Y ink are simultaneously printed, (2) as illustrated in the area (A) in FIG. 5, the total ink amount may be large in a case where the M ink and the Y ink are simultaneously printed, (3) as illustrated in the area (B) in FIG. 5, the total ink amount may be large in a case where the M ink and the C ink are simultaneously printed, and (4) as illustrated in the area (C) in FIG. 5, the total ink amount may be large in a case where the M ink, the Y ink, and the K ink are simultaneously printed, and that a printing ratio of the Y ink and the K ink is less than 100% in total, and the ink usage amount of the M ink is relatively larger than the ink usage amounts of the Y ink and the K ink.

Figure 6:
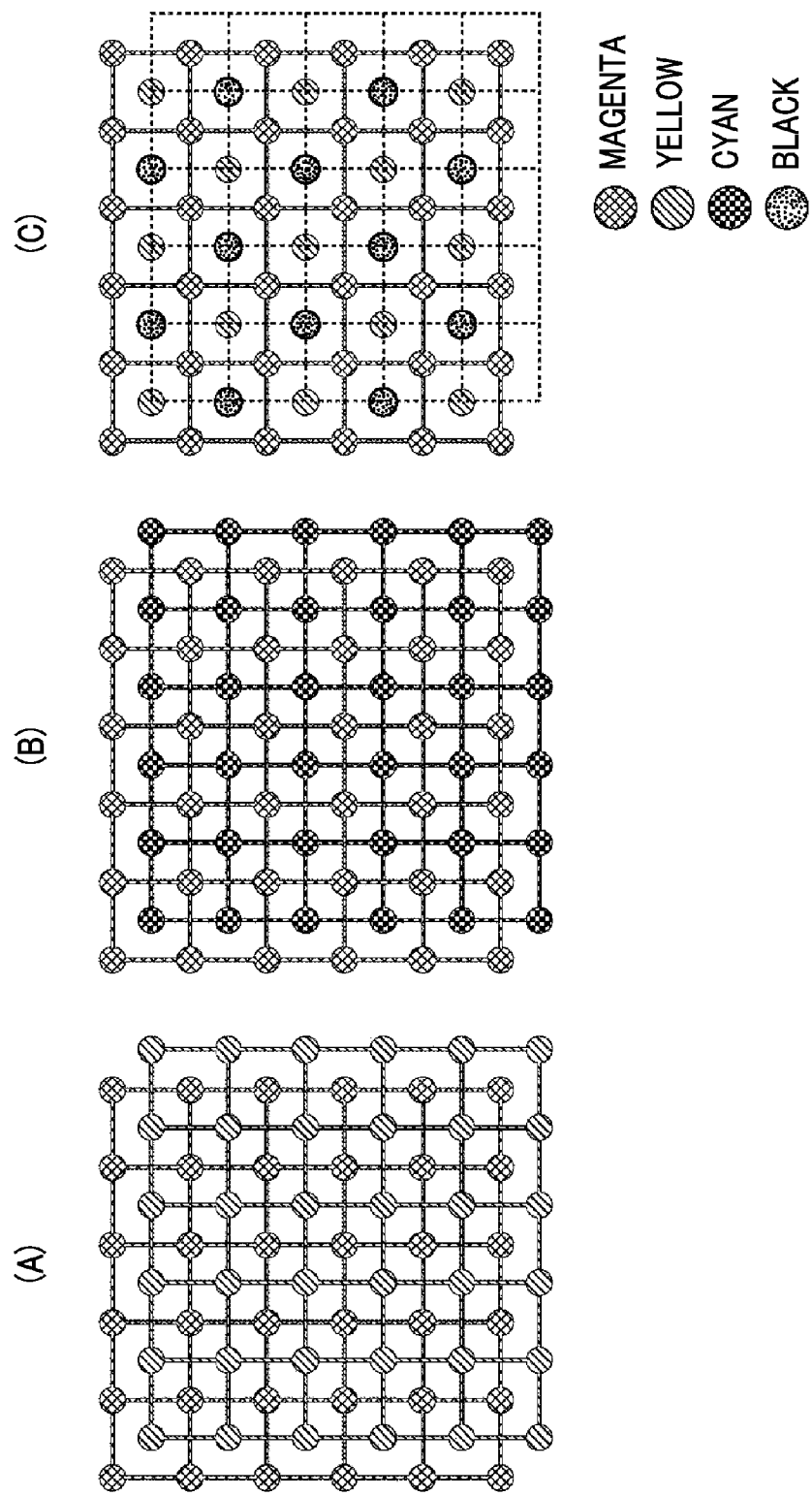
FIG. 6 is a diagram illustrating a print pattern according to a first embodiment.

Further, the present inventors have repeated intensive research and found from the findings (2) above that it is possible to realize an image in which generation of a mottle has been suppressed and deterioration of graininess has been suppressed as much as possible by forming the halftone image so that the print positions of liquid droplets of the M ink and liquid droplets of other inks with two or more colors are different to make it easy to absorb inks into the corrugated fibreboard recording medium. That is, the present inventors have found that it is preferable to form the halftone so that the droplet ejection positions of the M ink and the Y ink are different as illustrated in FIG. 6(A), droplet ejection positions of the M ink and the C ink are different as illustrated in FIG. 6(B) from the findings (3) above, and droplet ejection positions of the M ink, the Y ink, and the K ink are different and droplet ejection positions of the Y ink and the K ink are different as illustrated in FIG. 6(C) from the findings (4) above.

Details of the halftone processing method found in this way will be described below.

Finally, in step S18, a halftone image is formed on the recording medium by the inkjet recording device on the basis of the image signal of the halftone pattern of each color determined through the halftone process, and the image formation method according to this embodiment ends.

Next, the halftone process in step S16 described above will be described in detail with reference to FIGS. 7 to 12.

Here, halftone processing in inkjet printing using MKY inks will be described.

Figure 7:
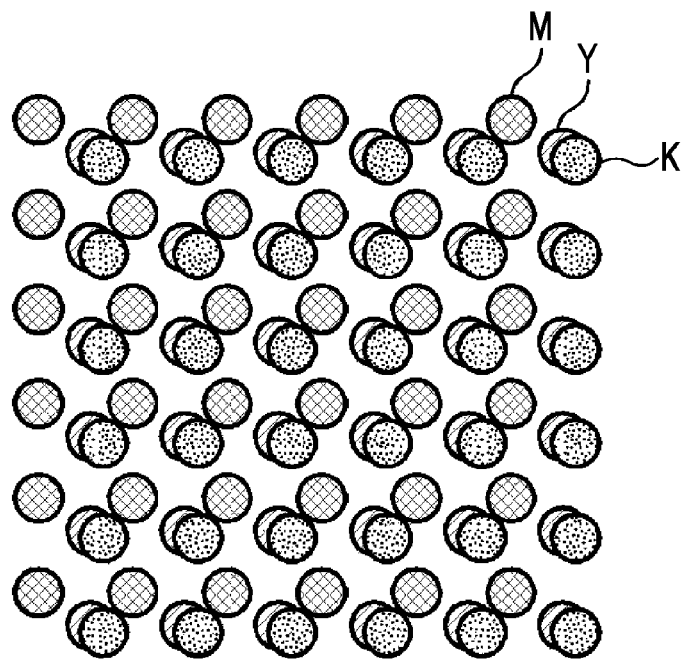
FIG. 7 is a diagram illustrating an example of a print pattern according to the first embodiment.

FIG. 7 illustrates an example of a print pattern that is printed on a recording medium by the inkjet recording device in this embodiment. In FIG. 7, dots indicated by a mesh indicate magenta (M), dots indicated by oblique lines indicate yellow (Y), dots indicated by sand indicate black (K). Here, the magenta dots and dots of other colors (the black dots and the yellow dots) are formed so that print positions are different. That is, the magenta dots and the dots of the other color (the black dots and the yellow dots) have different droplet ejection positions on a halftone image. Further, the black dots and the yellow dots are formed so that the print positions are the same.

Figure 8:
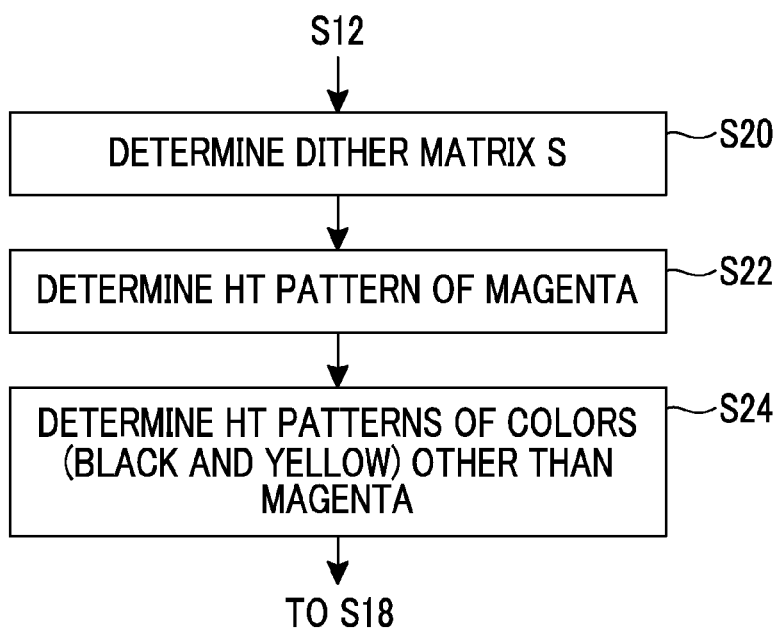
FIG. 8 is a flowchart illustrating a halftone processing method according to the first embodiment.
Figure 9A:
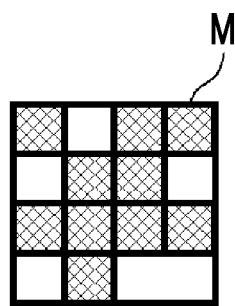
FIGS. 9A to 9C are diagrams illustrating a determination order of halftone patterns according to the first embodiment.
Figure 9B:
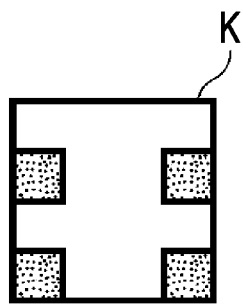
Figure 9C:
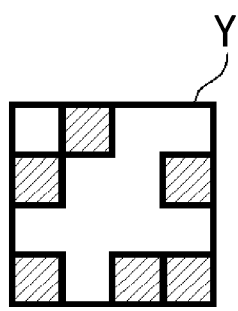

FIG. 8 illustrates a flowchart of a halftone processing method according to this embodiment, and FIGS. 9A to 9C are diagrams illustrating an order of determining a halftone pattern of each color. FIGS. 10 to 12 are diagrams illustrating a method of determining a halftone pattern of each color.

Figure 10A:
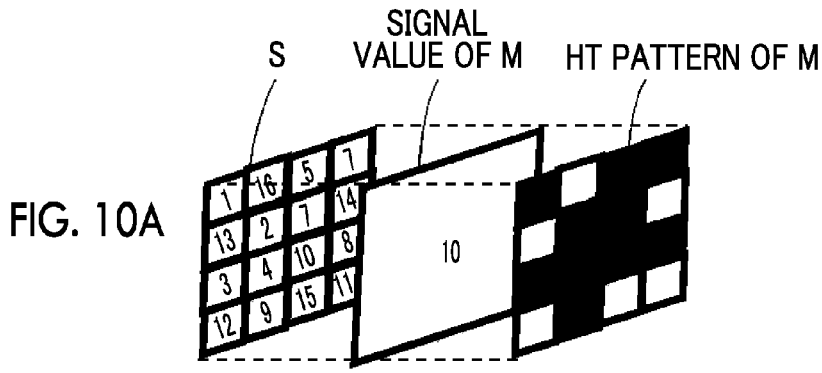
FIGS. 10A to 10D are diagrams illustrating a method of determining a halftone pattern of each color according to the first embodiment.

First, after the color conversion process in step S12 ends, one dither matrix S suitable for image data (MYK image data) as illustrated in FIG. 10A is first determined in step S20. This dither matrix S has a threshold value pattern of 4 rows×4 columns, in which integers of 1 to 16 are randomly arranged one by one as threshold values, and portions (threshold value portions) to which the threshold values of the dither matrix S are written correspond to droplet ejection positions of inks that are jetted from an inkjet nozzle. Further, the liquid droplet (dot) that is jetted from the inkjet nozzle, ejected onto the recording medium, and formed is assumed to correspond to a size satisfying one threshold value portion thereof.

The matrix (pixel pattern) illustrated here is represented as a pixel pattern with 4×4 (=16) gradations, but this is one example. Since the matrix is determined according to the gradation of the halftone image, a matrix with 8×8 (64 gradations), 16×16 (256 gradations), or the like can also be used.

Then, in step S22, the halftone pattern of the magenta (M) as illustrated in FIG. 9A is determined.

As illustrated in FIG. 10A, the threshold value of the dither matrix S is compared with the signal value (10) of the image data of the magenta (M) to determine the halftone pattern of the magenta (M). In this halftone pattern of the magenta (M), the threshold value portions of 10 or less of the dither matrix S are printed.

Then, in step S24, the halftone patterns of the colors other than the magenta as illustrated in FIGS. 9B and 9C, that is, the black and the yellow are determined.

In this step, although an order of determining the halftone patterns of the colors other than the magenta is not particularly limited, and a method of determining a halftone pattern of the black (K) as the color other than the magenta will first be described with reference to FIGS. 10B to 10D.

Figure 10B:
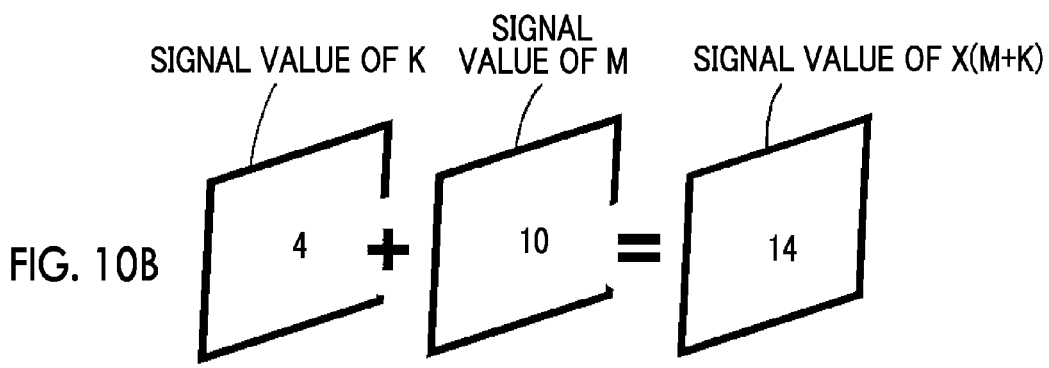
Figure 10C:
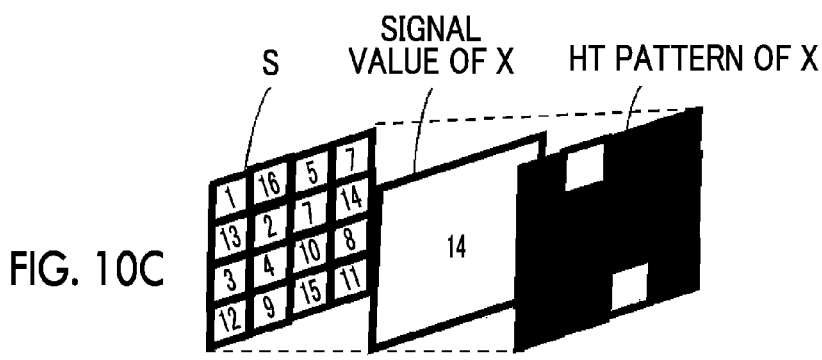
Figure 10D:
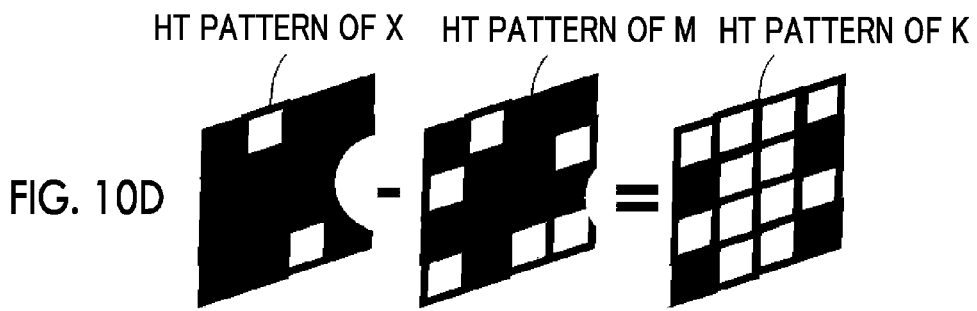

First, as illustrated in FIG. 10B, a signal value (14) obtained by adding a signal value (10) of image data of the magenta (M) to a signal value (4) of the black (K) is generated as a signal value of X and, as illustrated in FIG. 10C, the signal value (14) of X is compared with the threshold value of the dither matrix S to determine a halftone pattern corresponding to the signal value of X, that is, a halftone pattern in which the magenta (M) and the black (K) are superimposed on each other. In the halftone pattern corresponding to the signal value of X, threshold value portions with 14 or less of the dither matrix S are printed. Then, as illustrated in FIG. 10D, the halftone pattern corresponding to the signal value of X is compared with the halftone pattern of the magenta (M) to determine the halftone pattern of the black (K). In this halftone pattern of the black (K), a signal value of X at a position at the magenta (M) is printed is erased in the halftone pattern corresponding to the signal value of X.

Next, a method of determining the halftone pattern of the yellow (Y) will be described with reference to FIGS. 11A to 11C. For the determination of the halftone of the yellow (Y), the same method as the method of determining the halftone pattern of the black (K) is used.

Figure 11A:
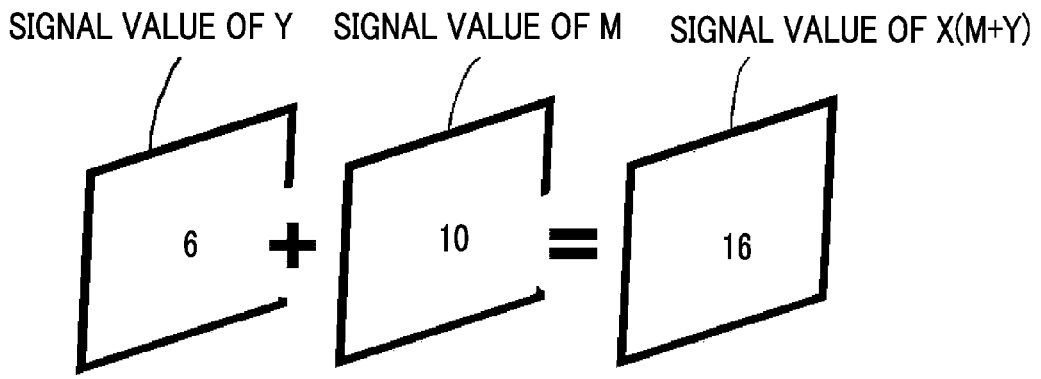
FIGS. 11A to 11C are diagrams illustrating a method of determining a halftone pattern of each color according to the first embodiment.
Figure 11B:
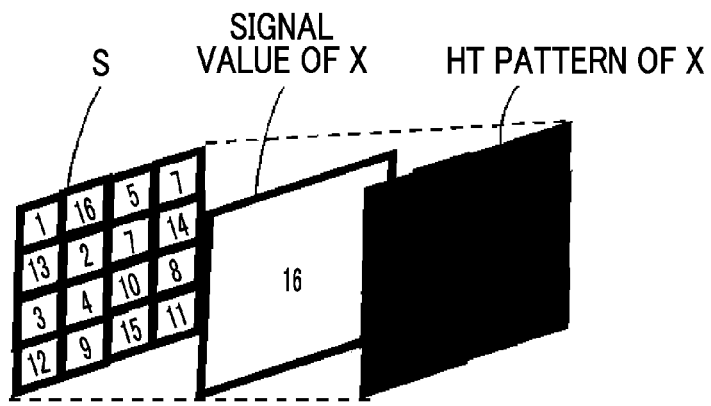
Figure 11C:
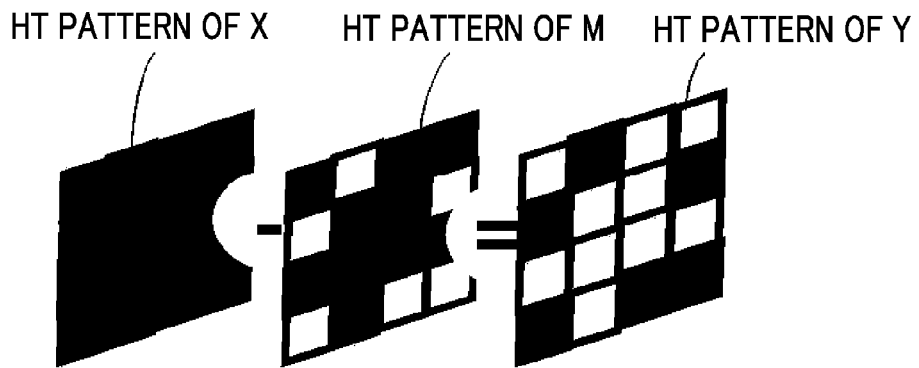

That is, as illustrated in FIG. 11A, a signal value (16) obtained by adding a signal value (10) of the image data of the magenta (M) to a signal value (6) of the image data of the yellow (Y) is generated as a signal value of X and, as illustrated in FIG. 11B, this signal value (16) of X is compared with the threshold value of the dither matrix S to determine a halftone pattern corresponding to the signal value of X, that is, a halftone pattern ill which the magenta (M) and the yellow (Y) overlap. In the halftone pattern corresponding to the signal value of X, a threshold value portion with 16 or less of the dither matrix S is printed. Then, as illustrated in FIG. 11C, the halftone pattern corresponding to the signal value of X is compared with the halftone pattern of the magenta (M) to determine the halftone pattern of the yellow (Y). In this halftone pattern of the yellow (Y), the signal value of X at a position at which the magenta (M) is printed has been erased in the halftone pattern corresponding to the signal value of X.

Thus, the image data for determining the halftone patterns of the magenta, the black, and the yellow as illustrated in FIGS. 9A to 9C is formed. That is, the halftone image is formed in which the droplet ejection position of the magenta and the droplet ejection positions of the other color dots (black dots and yellow dots) are different.

In a case where inks are ejected onto the recording medium on the basis of the halftone image formed here, a printing pattern as illustrated in FIG. 7 is formed. That is, an image is formed in which the print positions of the magenta dots and the other color dots (black dots and yellow dots) are different, and the print positions of the black dots and the yellow dots are the same.

In the above-described embodiment, the case where the value obtained by adding the signal value (10) of the image data of the magenta (M) to the signal value (4) of the image data of the black (K) and the signal value of X calculated by adding the signal value (10) of the image data of the magenta (M) to the signal value (6) of the image data of the yellow (Y) are signal values equal to or smaller than a maximum threshold value (16) of the dither matrix S as illustrated in FIGS. 10B and 11A has been illustrated, but a case where the values exceed the maximum threshold value (16) of the dither matrix S is also assumed. In such a case, the halftone patterns of the black (K) and the yellow (Y) are determined using the following method.

Figure 12A:
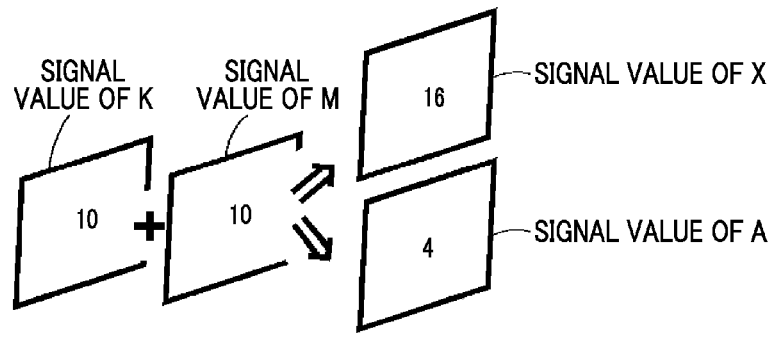
FIGS. 12A to 12E are diagrams illustrating a method of determining a halftone pattern of each color according to the first embodiment.

As illustrated in FIG. 12A, in a signal value (20) generated by adding a signal value (10) of the image data of the magenta (M) to a signal value (10) of the image data of the black (K), the signal value (16) that is the maximum threshold value of the dither matrix S is a signal value of X, and a remainder (4) thereof is a signal value of A.

Figure 12B:
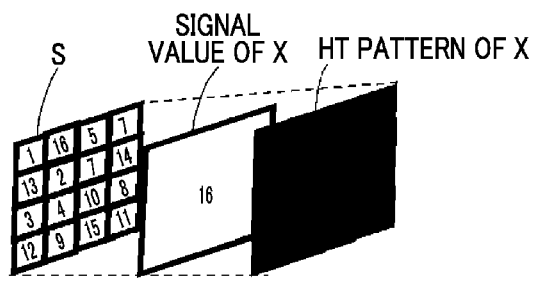

Then, as illustrated in FIG. 12B, a threshold value of the dither matrix S is compared with the signal value (16) of X to determine a halftone pattern corresponding to the signal value of X. The halftone pattern corresponding to the signal value of the X is a pattern in which a threshold value portion with 16 or less of the dither matrix S has been printed.

Figure 12C:
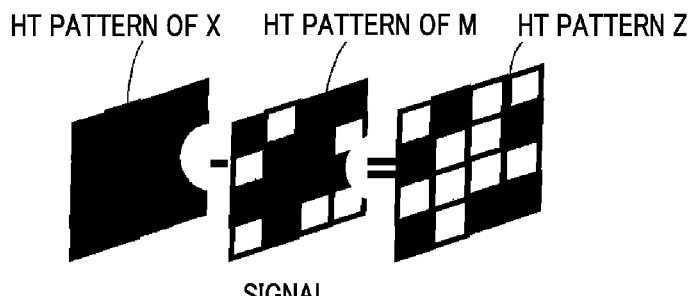

Then, as illustrated in FIG. 12C, the halftone pattern corresponding to the signal value of X is compared with the halftone pattern of the magenta (M) determined in FIG. 7A to determine a halftone pattern Z in which the signal value of Y at a point at which the magenta (M) is printed has been erased in the halftone pattern corresponding to the signal value of X.

Figure 12D:
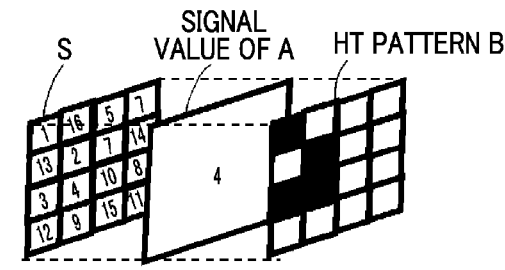

Then, as illustrated in FIG. 12D, the threshold value of the dither matrix S is compared with the signal value (4) of A to determine the halftone pattern B. This halftone pattern B is a pattern in which the threshold value portion with four or less of the dither matrix S is printed.

Figure 12E:
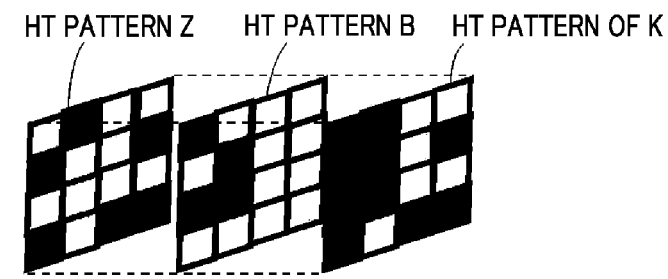

As illustrated in FIG. 12E, the halftone pattern Z is compared with the halftone pattern B to determine the halftone pattern of the black (K). This halftone pattern of the black (K) is a pattern in which the halftone pattern Z and the halftone pattern B have overlapped.

The halftone pattern of the black (K) includes a threshold value portion overlapping the halftone pattern of the magenta (M), but ink is color-mixed in the overlapped threshold value portion. That is, in the black (K) ink and the magenta (M) ink, a portion in which both liquid droplets overlap may be generated on the recording medium, that is, print positions may be the same. However, using the halftone creation method illustrated in FIGS. 12A to 12E, it is possible to create the halftone pattern of the black (K) in which the threshold value portion in which the magenta (M) and the black (K) overlap is minimized, that is, the overlap of the liquid droplets of the magenta (M) ink and the liquid droplets of the black (K) ink is minimized.

Even in a case where the value obtained by adding the signal value (10) of the image data of the magenta (M) to the signal value (6) of the image data of the yellow (Y) exceeds the maximum threshold value 16 of the dither matrix S, it is possible to determine the halftone pattern of the yellow (Y) using the same method.

In this embodiment, the case where the MKY inks are used for inkjet printing has been described, the present invention is not limited thereto. For colors or types of inks used for inkjet printing, other colors are not particularly limited as long as the magenta is used, and known colors, types, or number of inks can be used. For example, the inks with two colors including the magenta, and the cyan, the yellow, or the black can be used, the inks with three colors including the magenta, the cyan, and the yellow, or the magenta, the cyan, and the black can be used, or the inks with four colors including the magenta, the black, the yellow, and the cyan can be used.

Further, although the droplet ejection positions of the respective inks are different in this embodiment, the droplet ejection positions of the black (K) ink and the yellow (Y) ink can be the same positions such that the liquid droplets of inks the respective inks with different coloring materials printed at a predetermined pitch on the corrugated fibreboard recording medium overlap. That is, the droplet ejection position of the magenta (M) ink, and the droplet ejection positions of the black (K) ink and the yellow (Y) ink are different, but the droplet ejection positions of the black (K) ink and the yellow (Y) ink can be the same positions to cause the print positions of the black (K) ink and the yellow (Y) ink to be the same.

The recording medium is not particularly limited as long as the recording medium is a corrugated fibreboard recording medium, but it is preferable to use a corrugated fibreboard called a K liner or a C liner.

Second Embodiment

Figure 13:
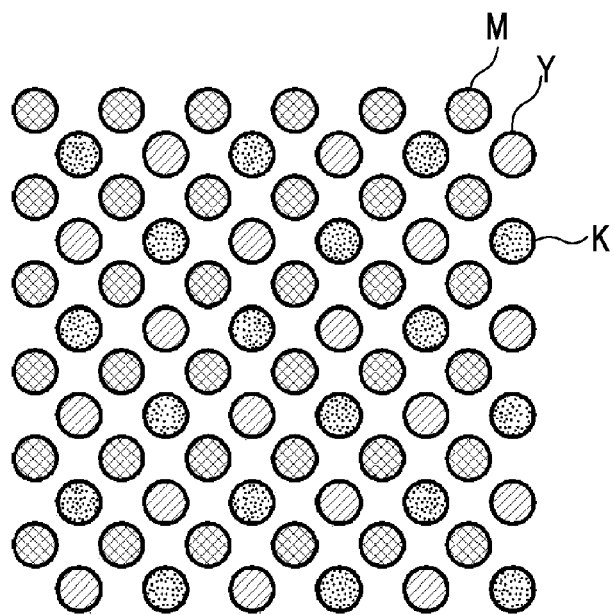
FIG. 13 is a diagram illustrating an example of a print pattern according to a second embodiment.

Although in the first embodiment, the halftone patterns of the respective colors have been determined to obtain the printing pattern in which liquid droplets of the plurality of inks other than the magenta, that is, the black (K) dots and the yellow (Y) dots overlap, as illustrated in FIG. 7, the halftone patterns of the respective colors can also be determined to obtain a printing pattern in which overlap of liquid droplets of inks with different coloring materials, that is, the black (K) dots and the yellow (Y) dots is minimized and, preferably, to obtain a printing pattern in which the liquid droplets of inks with different coloring materials, that is, the black (K) dots and the yellow (Y) dots do not overlap at all as illustrated in FIG. 13.

Figure 14:
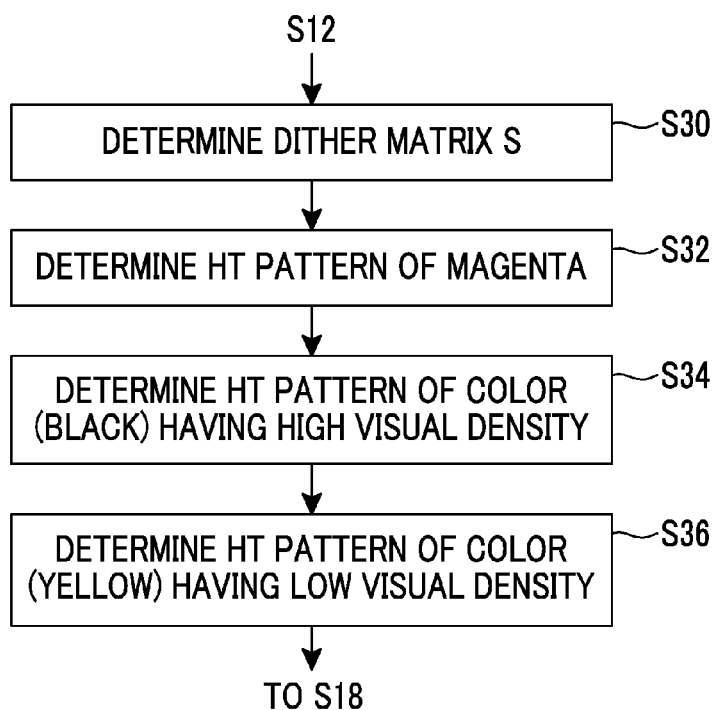
FIG. 14 is a flowchart illustrating a halftone processing method according to the second embodiment.
Figure 15A:
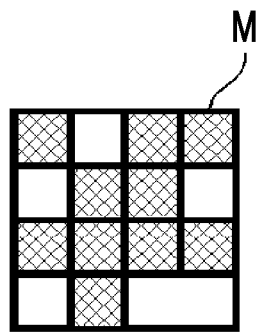
FIGS. 15A to 15C are diagrams illustrating an order of determining a mask pattern of each ink according to the second embodiment.
Figure 15B:
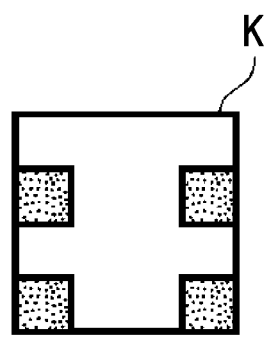
Figure 15C:
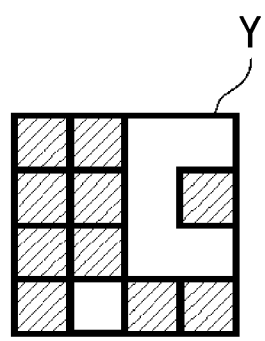

FIG. 14 illustrates a flowchart of the halftone processing method according to this embodiment, and FIGS. 15A to 15C are diagrams illustrating a determination order for halftone patterns of respective colors.

First, after the color conversion process in step S12 ends, one dither matrix S suitable for image data (MKY image data) as illustrated in FIG. 10A is first determined in step S30, as in the first embodiment.

Further, in subsequent step S32, the halftone pattern of the magenta (M) as illustrated in FIG. 15A is determined using the same method as in the first embodiment. That is, as illustrated in FIG. 10A, the threshold value of the dither matrix S is compared with the signal value (10) of the image data of the magenta (M) to determine the halftone pattern of the magenta (M).

After the halftone of the magenta (M) has been determined in this way, the halftone patterns of other colors are determined in an order of colors having a high visual density.

In step S34, a halftone pattern of a color having a high visual density and, in this embodiment, the black (K) as illustrated in FIG. 15B among the colors other than the magenta is determined. In this step S34, the halftone pattern of the black (K) is determined using the same method as in the first embodiment. That is, the halftone pattern of the black (K) is determined as illustrated in FIGS. 10B to 10D and FIGS. 12A to 12E.

Then, in step S36, a halftone pattern of a color having a low visual density, that is, the yellow (Y) as illustrated in FIG. 15C among the colors other than the magenta is determined. That is, the halftone pattern of the yellow (Y) is determined not to overlap the halftones of the magenta (M) and the black (K) that have been previously determined.

An example of a method of determining the halftone pattern of the yellow (Y) will be described with reference to FIGS. 16A to 16C and FIGS. 17A and 17B.

Figure 16A:
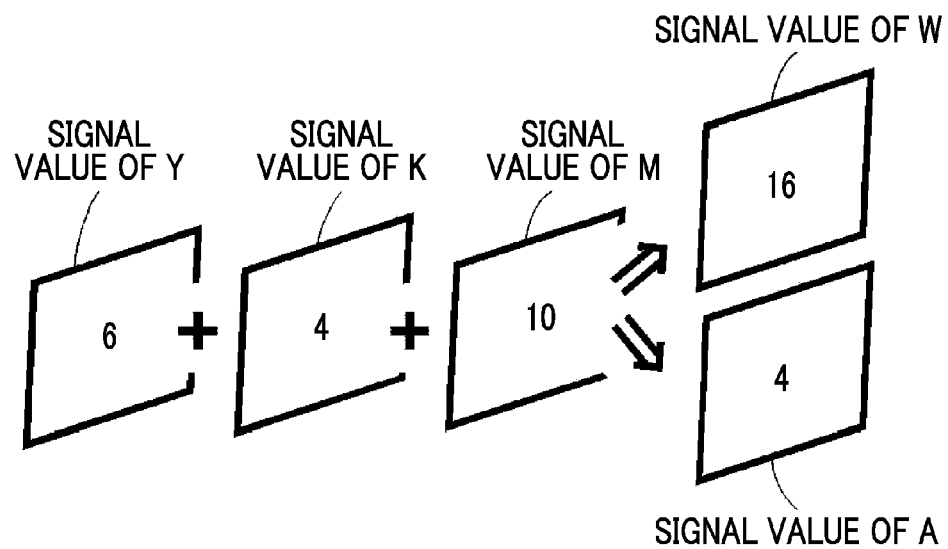
FIGS. 16A to 16C are diagrams illustrating a method of determining a halftone pattern of each color according to the second embodiment.

As illustrated in FIG. 16A, in a signal value (20) generated by adding the signal value (4) of the image data of the black (K) and the signal value (6) of the image data of the yellow (Y) to the signal value (10) of the image data of the magenta (M), the signal value (16) that is the maximum threshold value of the dither matrix S is defined as a signal value of W, and a remainder (4) thereof is defined as a signal value of A.

Figure 16B:
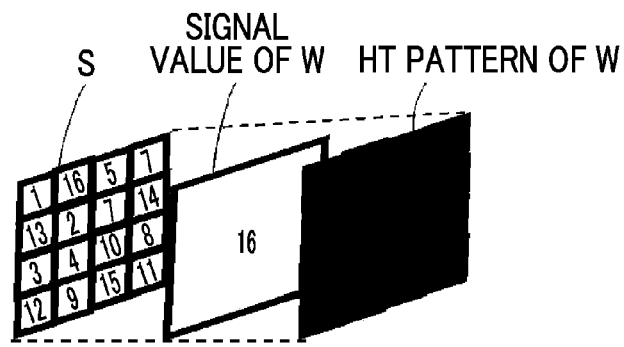

As illustrated in FIG. 16B, the threshold value of the dither matrix S is compared with the signal value (16) of the W to determine a halftone pattern corresponding to the signal value of W. The halftone pattern corresponding to the signal value of W is a pattern in which a threshold value portion with 16 or less of the dither matrix S has been printed.

Figure 16C:
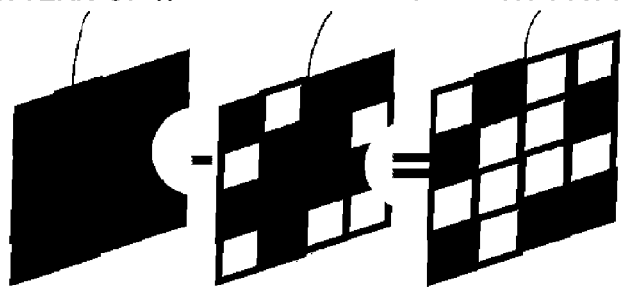

As illustrated in FIG. 16C, the halftone pattern corresponding to the signal value of W is compared with the halftone pattern of the magenta (M) to determine a halftone pattern Z in which the signal value of W at a point at which the M ink is printed has been erased in the halftone pattern corresponding to the signal value of W.

Figure 17A:
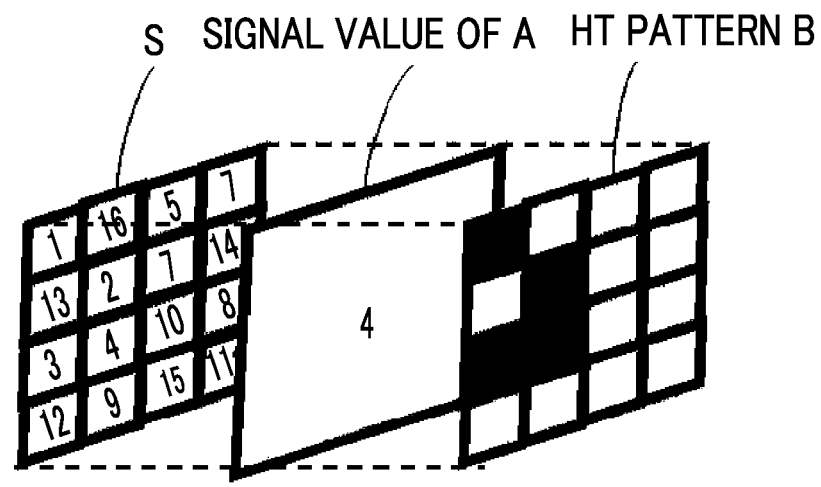
FIGS. 17A and 17B are diagrams illustrating a method of determining a halftone pattern of each color according to the second embodiment.

As illustrated in FIG. 17A, the threshold value of the dither matrix S is compared with the signal value (4) of A to determine the halftone pattern B. This halftone pattern B is a pattern in which the threshold value portion with four or less of the dither matrix S is printed.

Figure 17B:
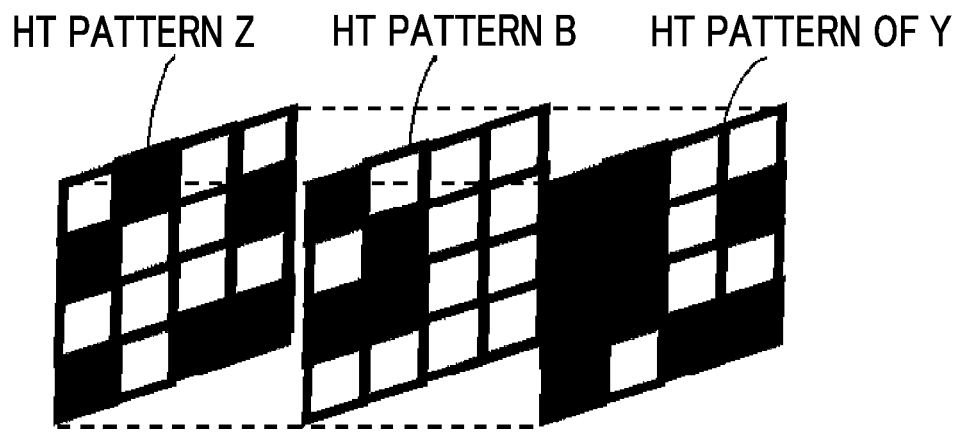

As illustrated in FIG. 17B, the halftone pattern Z is compared with the halftone pattern B to determine the halftone pattern of the yellow (Y). This halftone pattern is a pattern in which the halftone pattern Z and the halftone pattern B have overlapped.

The halftone pattern of the yellow (Y) includes a threshold value portion overlapping the halftone pattern of the magenta (M) or the black (K). That is, in the yellow (Y) ink, and the magenta (M) ink and the black (K) ink, a portion in which both liquid droplets overlap may be generated on the recording medium, that is, print positions may be the same. However, using the halftone creation method illustrated in FIGS. 17A and 17B, it is possible to create the halftone pattern of the yellow (Y) in which the threshold value portion overlapping the yellow (Y), and the magenta (M) and the black (K) is minimized, that is, the overlap of the liquid droplets of the yellow (Y) ink, and the magenta (M) and black (K) inks is minimized.

Thus, the halftone patterns of the magenta, the black, and the yellow as illustrated in FIGS. 15A to 15C are determined.

In this embodiment, two colors including the black and the yellow have been used as the colors other than the magenta. The present invention is not limited thereto, a combination of two other colors may be used, and inks of three or more colors may also be used. In this case, the halftone patterns are determined in an order of colors having a high visual density.

Figure 18A:
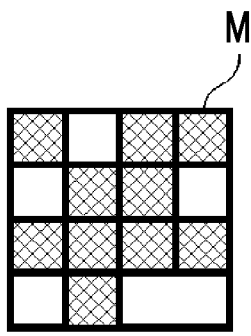
FIGS. 18A to 18C are diagrams illustrating a modification example of the order of determining a mask pattern of each ink according to the second embodiment.
Figure 18B:
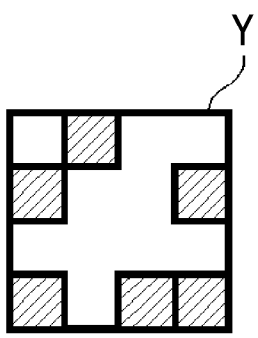
Figure 18C:
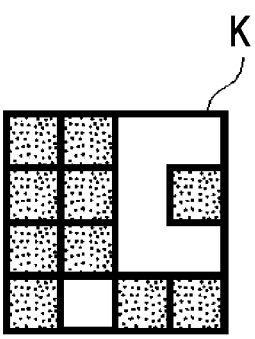

Further, in this embodiment, the halftone patterns are determined in an order of colors having a high visual density after the halftone of the magenta (M) is determined, but the present invention is not limited thereto and, as illustrated in FIGS. 18A to 18C, after the halftone of the magenta (M) illustrated in FIG. 18A is determined, the halftone pattern of the yellow (Y) illustrated in FIG. 18B may first be determined and then the halftone pattern of the black (K) illustrated in FIG. 18C may be determined.

Third Embodiment

Although the dither matrix that is common to the image data of the respective colors has been used in order to determine the halftone patterns of the respective colors in the first embodiment and the second embodiment, the present invention is not limited thereto, and different dither matrices can be used for the image data of the magenta (M) and the image data of two or more other colors (an X color) other than the magenta.

Figure 19:
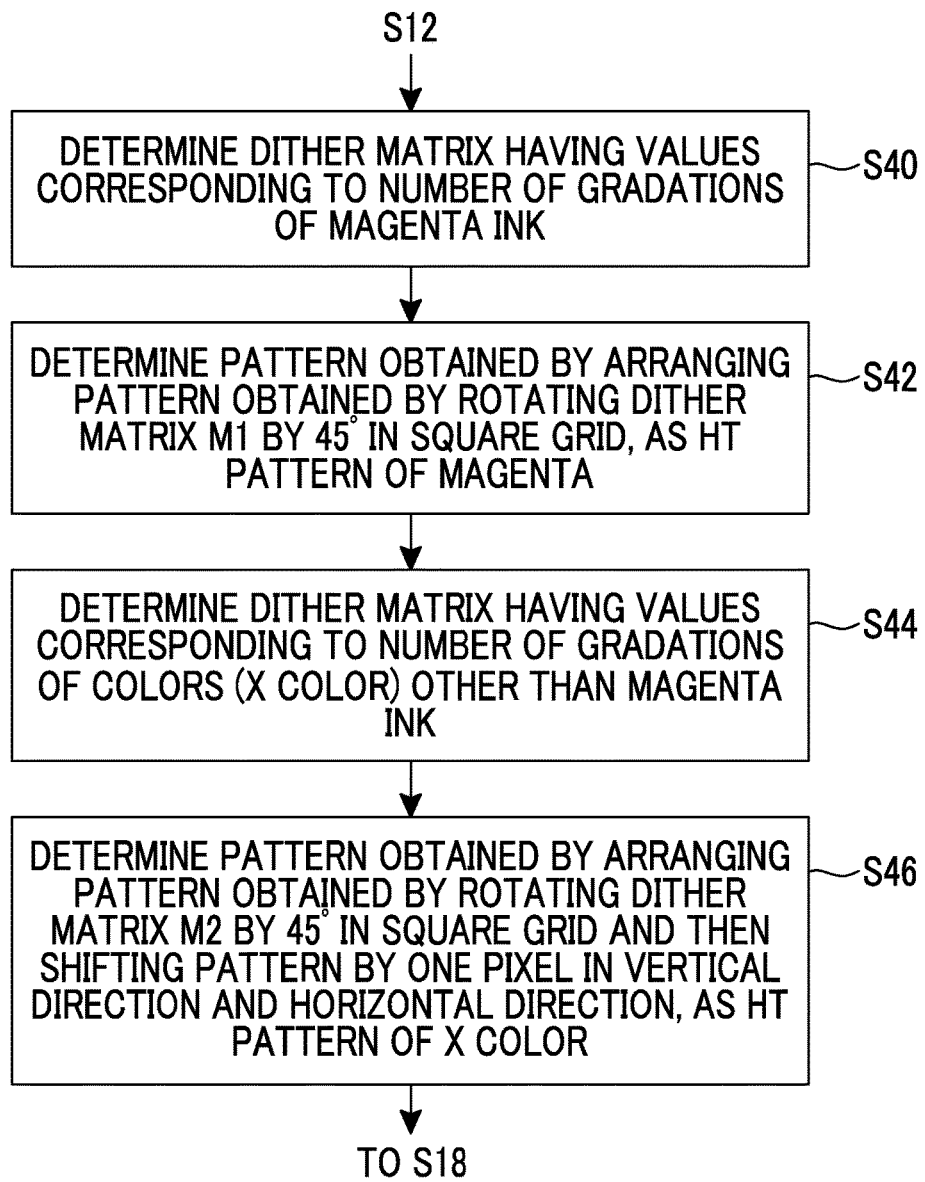
FIG. 19 is a flowchart illustrating a halftone processing method according to a third embodiment.

An example of a halftone processing method according to the third embodiment will be described in detail with reference to FIGS. 19 and 20. FIG. 19 illustrates a flowchart of the halftone processing method according to this embodiment, and FIGS. 20A and 20B are diagrams illustrating a method of determining the halftone pattern of each color.

Figure 20A:
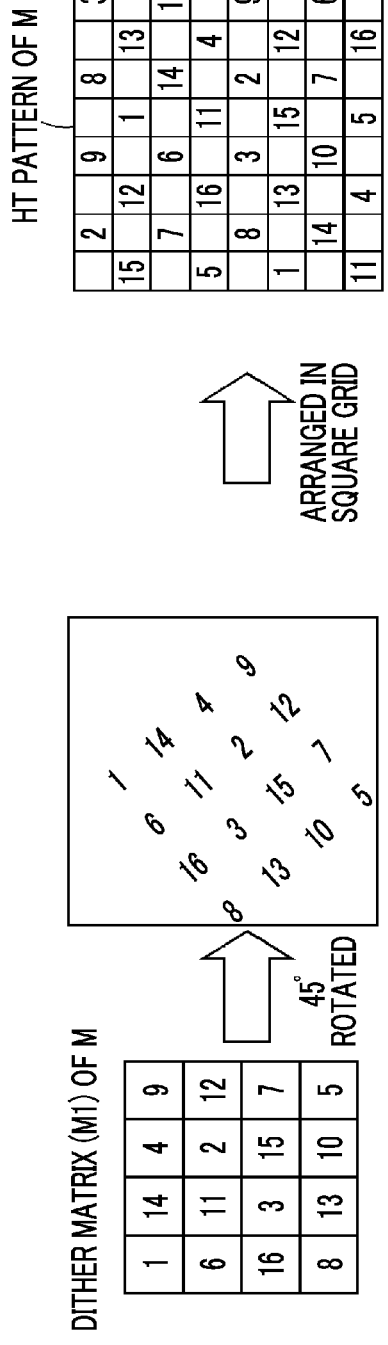
FIGS. 20A and 20B are diagrams illustrating a method of determining a halftone pattern of each color according to the third embodiment.

The dither matrix having values corresponding to the number of gradations of the magenta (M) is first determined as illustrated in FIG. 20A using a systematic dither method or the like in step S40, and a mask pattern obtained by rotating the determined dither matrix of the magenta (M) by 45° is arranged in a square grid in step S42 to determine the halftone pattern of the magenta (M). In this pattern, the magenta ink is treated not to be ejected onto a position at which there is no signal.

Figure 20B:
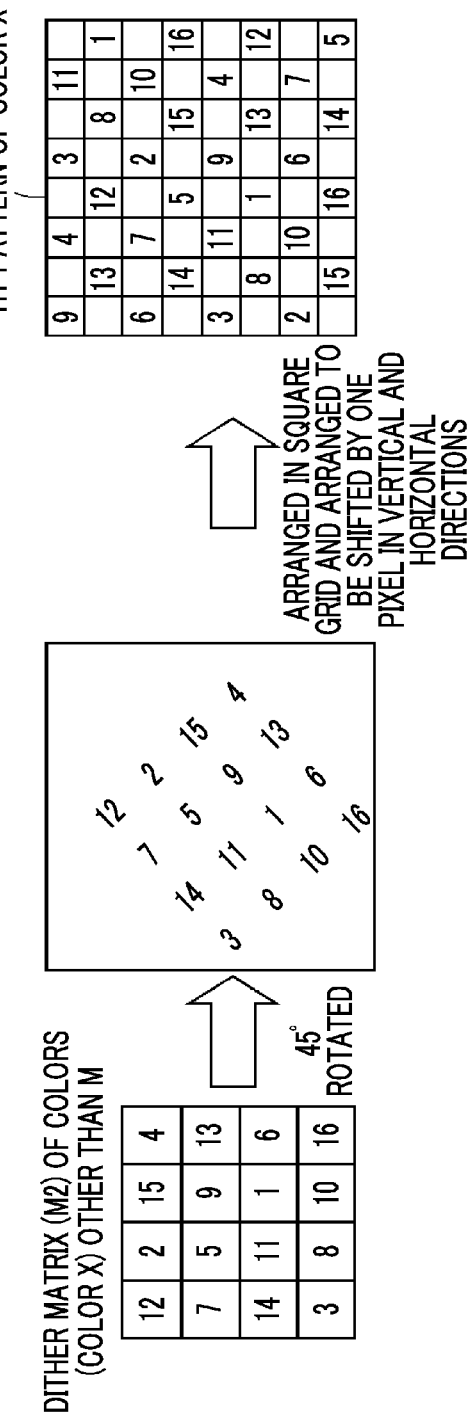

Then, a dither matrix having values corresponding to the number of gradations of other colors (the X color) other than the magenta ink as illustrated in FIG. 20B is determined using the systematic dither method or the like in step S44, and the determined dither matrix is rotated by 45°, and then a mask pattern thereof is arranged in a square grid and shifted by one pixel in the vertical direction and the horizontal direction not to overlap the mask pattern of the magenta ink determined in FIG. 20A (to be shifted by a half pitch) in step S46, and a resultant pattern is determined as the halftone pattern of the colors (the X color) other than the magenta. In this pattern, the X color ink is treated not to be ejected at a position at which there is no signal.

Thus, since a degree of freedom of a position at which each halftone pattern is arranged is increased by using different dither matrices in the magenta (M) and the colors (the X color) other than the magenta, it is possible to improve image structure image quality (graininess and sharpness).

Figure 21:
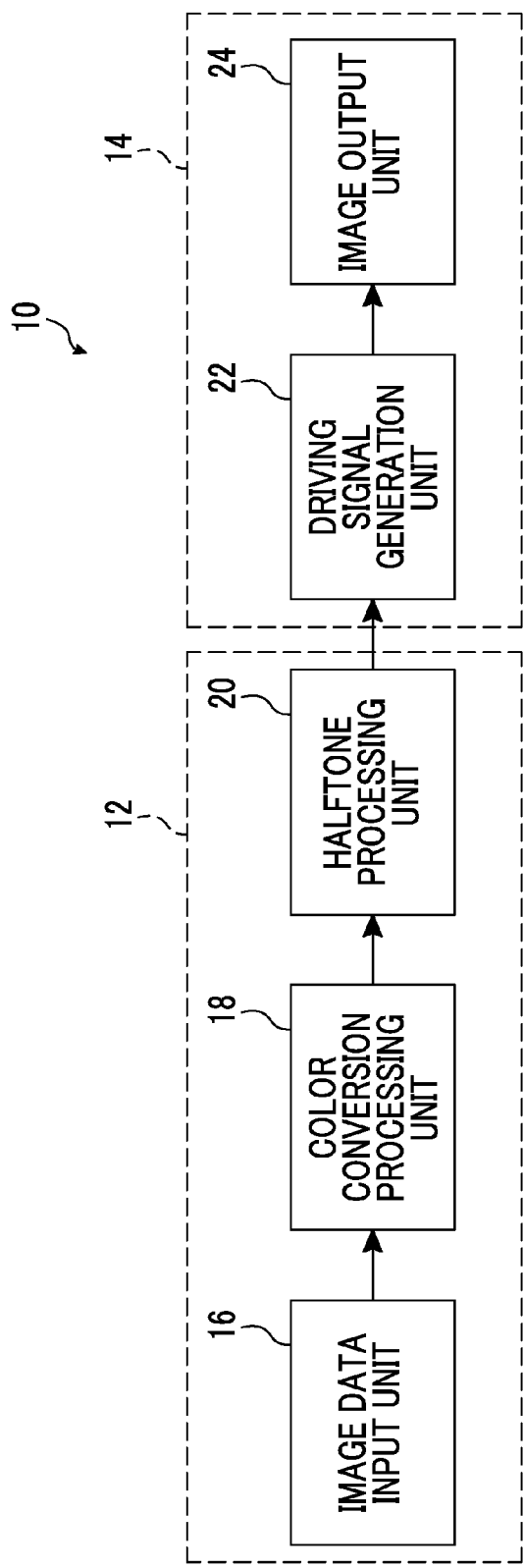
FIG. 21 is a block diagram illustrating a configuration of an inkjet recording system according to the first to third embodiments.

FIG. 21 is a block diagram of an inkjet recording system for carrying out the image forming method according to the embodiment. An inkjet recording system 10 includes an image forming device 12 and an inkjet recording device 14.

In the inkjet recording system 10, a color image is acquired as RGB data by an image data input unit 16 of the image forming device 12, and the input color image is recorded on a recording medium using a plurality of inks by an image output unit 24 of the inkjet recording device 14.

A color conversion processing unit 18 converts the RGB data input from the image data input unit into image data (CKY data) of each color and outputs the CKY data. This CKY data includes image data of the magenta (M), image data of the black (K), and image data of the yellow (Y) separated for each color.

Figure 22:
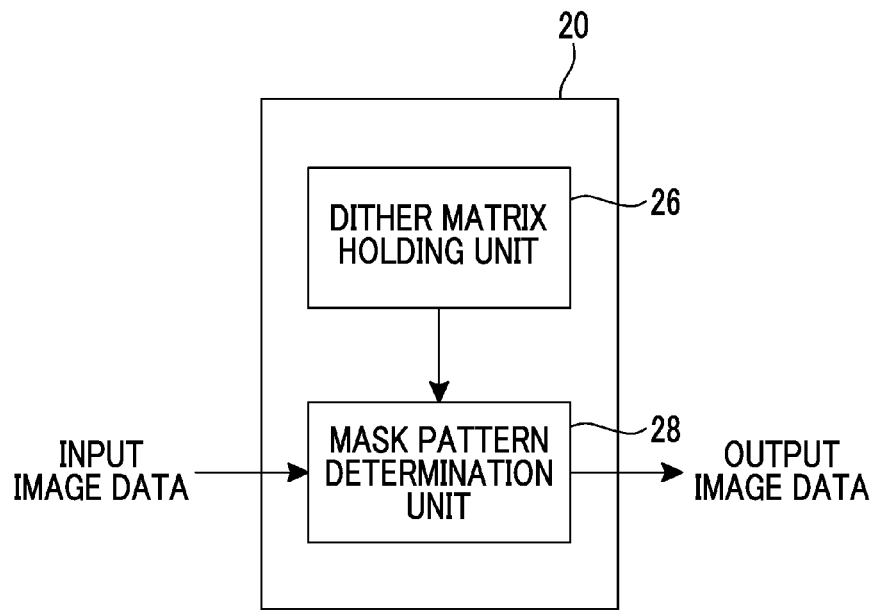
FIG. 22 is a block diagram illustrating a configuration of a halftone processing unit illustrated in FIG. 21.

A halftone processing unit 20 includes a dither matrix holding unit 26 that holds a pattern of the dither matrix, and a mask pattern determination unit 28 that determines a halftone pattern (mask pattern) of each color as a halftone image through dither matrix processing using a dither matrix on input image data (the image data of the magenta (M), the image data of the black (K), and the image data of the yellow (Y)), as illustrated in FIG. 22.

The halftone processing unit 20 determines, in the mask pattern determination unit 28, the halftone pattern of each color by performing dithering conversion by performing a comparison process between the signal values included in the image data of the magenta (M), the image data of the black (K), and the image data of yellow (Y) and the threshold value of the dither matrix having a threshold value arrangement determined in advance in the main scanning direction and the sub-scanning direction stored in the dither matrix holding unit 26. The halftone pattern of each of the colors determined by the mask pattern determination unit 28 is output to a driving signal generation unit 22 of the inkjet recording device 14 as the output image data.

The inkjet recording device 14 includes the driving signal generation unit 22, and an image output unit (recording head) 24 connected to the driving signal generation unit 22.

The driving signal generation unit 22 receives the halftone pattern of each color from the halftone processing unit 20 as halftone image data, and generates a driving signal value for driving the image output unit 24 so that inks are jetted at a jetting amount according to an image signal value of the halftone pattern.

The image output unit 24 is, for example, a recording head using an inkjet scheme that jets inks using expansion and contraction of a piezoelectric element, and the image output unit 24 jets the inks onto a recording medium to record a recording image. The recording head is not particularly limited as long as a plurality of arrays of inkjet heads in which a plurality of ink jetting nozzles are arranged in the sub-scanning direction (paper feeding direction) are arranged in a main scanning direction. For colors or types of inks output from the ink jetting nozzles, other colors are not particularly limited as long as the magenta is used, and known colors or types of inks may be used.

The inkjet recording device 14 used in the present invention is not particularly limited and a known inkjet recording device in the related art may be used. For example, in the inkjet recording device 14, although not particularly illustrated, a recording head using a long line head in which ink jetting nozzles of respective colors corresponding to a recording width (print width) of a recording medium are arranged in one line or a plurality of lines or a recording head using a carriage type of a short inkjet head in which the ink jetting nozzles of respective colors shorter than the recording width of the recording medium are arranged in one line or a plurality of lines may be used as a recording head using an inkjet scheme.

The recording medium is not particularly limited as long as the recording medium is a corrugated fibreboard recording medium and, for example, a corrugated fibreboard called a K liner or a C liner can be used.

Resolution of the inkjet recording device is not particularly limited, and the resolution is preferably 300 dpi or more.

Further, a program that causes a personal computer (PC) to execute the respective steps of the image forming method according to the embodiment, and a storage medium having this program stored therein are also included in the present invention.

Fourth Embodiment

Figure 23:
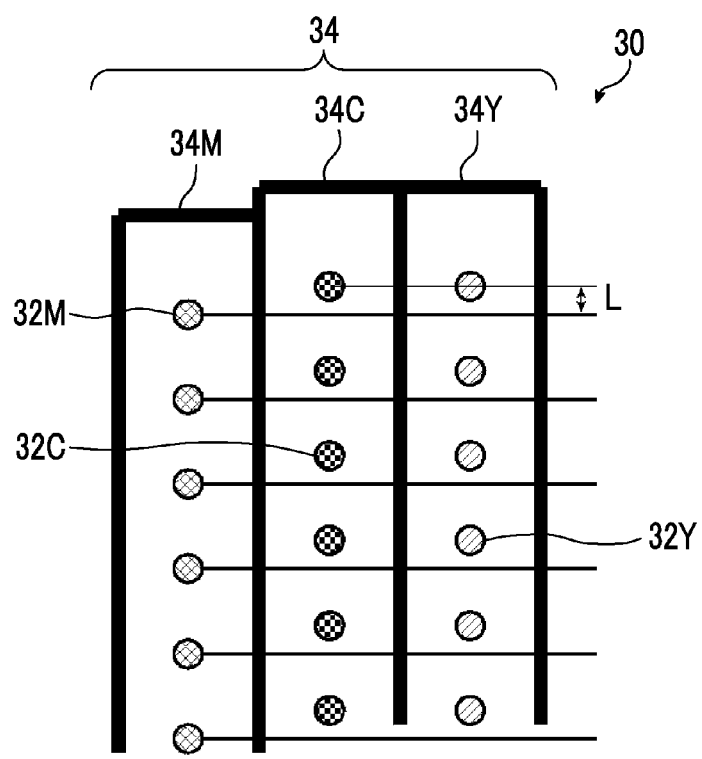
FIG. 23 is a diagram illustrating a configuration of a recording head according to a fourth embodiment.

Although the method of forming the halftone image by determining the halftone patterns of the magenta ink and other inks with two or more colors other than the magenta ink using the dither matrix to determine the droplet ejection positions of the magenta ink and the other inks with two or more colors that are ejected onto the corrugated fibreboard recording medium has been described in the above embodiment, a halftone image in which the droplet ejection positions of the magenta ink and the other inks with two or more colors that are ejected onto the corrugated fibreboard recording medium are different can be formed using a recording head as illustrated in FIG. 23.

A recording head 30 illustrated in FIG. 23 includes a magenta nozzle array 34M in which a plurality of nozzles 32M that jet magenta ink are arranged at a predetermined pitch in the main scanning direction and at equal intervals, a cyan nozzle array 34C in which a plurality of nozzles 32C that jet cyan ink are arranged at a predetermined in the main scanning direction and at equal intervals, and a yellow nozzle array 34Y in which a plurality of nozzles 32Y that jet yellow ink are arranged at a predetermined pitch in the main scanning direction and at equal intervals.

The "predetermined pitch" used herein indicates a distance between centers of nozzle holes of the adjacent nozzles. The distance between the centers of the nozzle holes of the adjacent nozzles may be the "pitch in the vertical direction" and the "pitch in the horizontal direction" described with reference to FIGS. 2A and 2B.

The cyan nozzle array 34C and the yellow nozzle array 34Y are arranged to be shifted by a half pitch L in the sub-scanning direction with respect to the magenta nozzle array 34M.

Although the cyan nozzle array 34C and the yellow nozzle array 34Y are arranged to be shifted by a half pitch in the sub-scanning direction with respect to the magenta nozzle array 34M in the above embodiment, the present invention is not limited thereto and the cyan nozzle array 34C and the yellow nozzle array 34Y may be arranged to be shifted by a half pitch in the main scanning direction.

Although the image forming method of the present invention has been described in detail using various embodiments and examples, the present invention is not limited to the embodiments and examples and it is understood that various improvements or changes may be made without departing from the gist of the present invention.

EXPLANATION OF REFERENCES

10: inkjet recording system
12: image forming device
14: inkjet recording device
16: image data input unit
18: color conversion processing unit
20: halftone processing unit
22: driving signal generation unit
24: image output unit
26: dither matrix holding unit
28: mask pattern determination unit
30: recording head
32M, 32C, 32Y: jetting nozzle
34M, 34C, 34Y: nozzle array

What is claimed is:

1. An image forming method of forming a halftone image on a corrugated fibreboard recording medium using an inkjet recording device that uses magenta ink and other inks with two or more colors other than the magenta ink, the image forming method comprising:
   determining a droplet ejection position of the magenta ink and then determining droplet ejection positions of the other inks with two or more colors to be positions different from the droplet ejection position of the magenta ink, wherein nozzles ejecting the magenta ink are not shifted relative to nozzles ejecting the other inks with two or more colors other than magenta ink.

2. The image forming method according to claim 1, wherein the droplet ejection positions of the other inks with two or more colors are determined so that print positions of a liquid droplet of the magenta ink and liquid droplets of the other inks with two or more colors that are ejected at a predetermined pitch onto the corrugated fibreboard recording medium are different.

3. The image forming method according to claim 1, wherein the droplet ejection positions of the other inks with two or more colors are determined so that droplet ejection positions of the inks having different coloring materials are different positions.

4. The image forming method according to claim 1, wherein the droplet ejection positions of the other inks with two or more colors are determined so that print positions of the liquid droplets of inks having different coloring materials to be ejected at a predetermined pitch on the corrugated fibreboard recording medium are different.

5. The image forming method according to claim 1, wherein the droplet ejection positions of the other inks with two or more colors are determined so that droplet ejection positions of the inks with different coloring materials are the same positions.

6. The image forming method according to claim 1, wherein in order to determine the droplet ejection position of the magenta ink and the droplet ejection positions of the other inks with two or more colors, a halftone pattern of the magenta ink having the predetermined pitch using a dither matrix is determined, and then, halftone patterns of other inks with the two or more colors having the predetermined pitch are determined to fill a predetermined area of the dither matrix to which the halftone pattern of the magenta ink is not assigned.

7. The image forming method according to claim 6, wherein halftone patterns of the other inks with two or more colors are determined using the dither matrix so that liquid droplets of inks having different coloring materials of the other inks with two or more colors that are ejected onto the corrugated fibreboard recording medium overlap in order to determine the droplet ejection positions of the other inks with two or more colors.

8. The image forming method according to claim 6, wherein halftone patterns of the other inks with two or more colors are determined using the dither matrix so that print positions of liquid droplets of inks having different coloring materials of the other inks with two or more colors that are ejected onto the corrugated fibreboard recording medium are different in order to determine the droplet ejection positions of the other inks with two or more colors.

9. The image forming method according to claim 8, wherein halftone patterns of other inks with two or more colors are determined preferentially from an ink having the highest visual density using the dither matrix in order to determine the droplet ejection positions of the other inks with two or more colors.

10. The image forming method according to claim 1, wherein halftone patterns of the magenta ink and the other inks with two or more colors are determined so that the halftone pattern of the magenta ink and the halftone patterns of the inks with two or more colors are shifted by a half pitch using the dither matrix in order to determine the droplet ejection position of the magenta ink and the droplet ejection positions of the other inks with two or more colors.

11. The image forming method according to claim 1, wherein the inkjet recording device includes a recording head including a magenta nozzle array in which a plurality of nozzles that jet the magenta ink are arranged at a predetermined pitch in a main scanning direction and at equal intervals, and two or more other ink nozzle arrays in which a plurality of nozzles that jet other inks with two or more colors are arranged at a predetermined pitch in the main scanning direction and at equal intervals for each coloring material, and the two or more other ink nozzle arrays are arranged to be shifted by the half pitch in the main scanning direction or a sub-scanning direction with respect to the magenta nozzle array.

* * * * *